United States Patent
Martin, Jr. et al.

(10) Patent No.: US 6,715,131 B2
(45) Date of Patent: Mar. 30, 2004

(54) METHOD AND SYSTEM FOR PROVIDING RESOURCE ACCESS IN A MOBILE ENVIRONMENT

(75) Inventors: Bruce K. Martin, Jr., Palo Alto, CA (US); Arnaud P. Y. Capitant, Paris (FR); Lawrence M. Stein, San Jose, CA (US); Jonathan M. Wulff, Los Gatos, CA (US); Andrew L. Laursen, San Mateo, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 10/458,033

(22) Filed: Jun. 9, 2003

(65) Prior Publication Data

US 2003/0214529 A1 Nov. 20, 2003

Related U.S. Application Data

(62) Division of application No. 09/575,901, filed on May 22, 2000, now Pat. No. 6,610,105, which is a continuation-in-part of application No. 09/320,296, filed on Jun. 7, 1999, now Pat. No. 6,233,608, which is a continuation of application No. 08/987,346, filed on Dec. 9, 1997, now Pat. No. 6,065,120.
(60) Provisional application No. 60/154,420, filed on Sep. 17, 1999.

(51) Int. Cl.[7] .................................................. G06F 3/14
(52) U.S. Cl. ..................................................... 715/526
(58) Field of Search ................................ 715/526, 500, 715/500.1; 709/208, 217–219; 707/10

(56) References Cited

U.S. PATENT DOCUMENTS

| | | | |
|---|---|---|---|
| 6,169,992 B1 | 1/2001 | Beall et al. | 707/103 |
| 6,178,433 B1 | 1/2001 | Nakamura et al. | 715/513 |
| 6,317,781 B1 | 11/2001 | De Boor et al. | 709/217 |
| 6,377,886 B1 | 4/2002 | Gotou et al. | 701/201 |

FOREIGN PATENT DOCUMENTS

| | | |
|---|---|---|
| GB | 2 331 600 A | 5/1999 |
| WO | WO 97/49044 | 12/1997 |

OTHER PUBLICATIONS

Bickmore et al., "Digestor: device–independent access to the World Wide Web," Computer Networks and ISDN Systems, vol. 29, No. 8–13, Sep. 1997, pp. 1075–1082.

Greg Hewgill, "Copilot User's Manual," Copilot User's Manual Version 1.0 Beta 9, URL: www.hewgill.com/pilot/copilot/copilot.html.

*Primary Examiner*—Thomas M. Heckler
(74) *Attorney, Agent, or Firm*—Beyer Weaver & Thomas, LLP

(57) ABSTRACT

Techniques that facilitate participation of mobile devices in accessing resources over a data network are disclosed. The data network can be wired, wireless or some combination thereof. In one aspect, a mobile navigation metaphor is provided to yield similar navigation experiences on both mobile devices and personal computers. In another aspect, a central content server is able to return requested content to requesters in a format suitable for their device.

15 Claims, 14 Drawing Sheets

| Applications | HTML Browser | WML Browser |
|---|---|---|
| Home page | my.phone.com/ | my.phone.com/ |
| mail | my.phone.com/mail | www.xyz1.com/mail |
| stocks | my.phone.com/finance/'HTML' | my.phone.com/finance/'WML' |
| • • • | • • • | • • • |

METHOD AND SYSTEM FOR PROVIDING RESOURCE ACCESS IN A MOBILE ENVIRONMENT

CROSS REFERENCE TO RELATED APPLICATIONS

This application is a Divisional application of co-pending U.S. patent application Ser. No. 09/575,901, entitled "Method And System for Providing Resource Access in a Mobile Environment," filed May 22, 2000, now U.S. Pat. No. 6,610,105, which claims the benefit of U.S. Provisional Application No. 60/154,420, filed Sep. 17, 1999, entitled "Method and System for Providing a Mobile Navigation Metaphor," and which is a continuation-in-part of U.S. patent application Ser. No. 09/320,296, filed Jun. 7, 1999, entitled "Method and System for Securely Interacting With Managed Data From Multiple Devices," now U.S. Pat. No. 6,233,608, which is a continuation of U.S. patent application Ser. No. 08/987,346, filed Dec. 9, 1997, entitled "Method And Architecture For Self-Provisioning a Rendezvous To Ensure Secure Access to Information In a Database From Multiple Devices," now U.S. Pat. No. 6,065,120, and assigned to the assignee of the present application, the disclosures of all of which are incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

1. Field of the Invention

The present invention relates to user interfaces for computing devices and, more specifically, to methods and systems providing consistent user interaction with a user interface of a wireless portal.

2. Description of the Related Art

The Internet is a rapidly growing communication network of interconnected computers and computer networks around the world. Together, these millions of connected computers form a repository of multimedia information that is readily accessible by any of the connected computers from anywhere at any time. To facilitate the navigation of this repository, a number of Internet access providers offer portals to the World Wide Web for users.

In a general sense, a "portal" is a door or entrance, especially a grand or imposing one. In the context of the present invention, portal is a relatively new term for a World Wide Web site that is or proposes to be a major starting site for users when they get connected to the World Wide Web, or that users tend to visit as an anchor site. Such a portal site is typically represented as a page that contains links to numerous other sites, with the links being organized according to subject matter or the type of services offered at those sites. With the commercial success of such search engines that have transformed into portals such as Yahoo! (www.yahoo.com) and Excite (www.excite.com), it has become desirable, both from the point of view of the companies operating the portals and the ultimate end-users, to establish such Internet portals.

In order to provide mobility and portable access to the World Wide Web, interactive two-way communication mobile devices have been introduced that are capable of communicating, via wireless data networks, with the Internet. As an example, see U.S. Pat. No. 5,809,415, which is assigned to the assignee of the present invention, and hereby incorporated by reference herein. The interactive two-way communication mobile devices include two-way pagers, cellular phones, palm-sized computing devices and personal digital assistant (PDA) devices, and are among the fastest emerging communication devices. Such devices enable users to receive, collect, analyze, review and disseminate information as they travel or move about.

In a similar manner to the portals that have been designed to assist desktop computer users to navigate on the Internet, efforts have been commenced to provide portals designed specifically for users of mobile devices. For example, wireless or portable portals offered by AirFlash.com, Inc. (see www.airflash.com) and Saraide, Inc. (see www.saraide.com) are designed for access by users of mobile devices.

However, a user's navigation experience on a display screen of a mobile device and through a typical portal viewed on a computer screen are conventionally very different. This is primarily because of the substantial differences between the user interfaces and menu structures of the two types of devices. In many cases, it is not at all intuitive how the links and organization of those links into menus in one environment are related to the presentation of those links and menus in the other environment. This can cause the user to be confused regarding how they should navigate through the menu structure to get to a desired link on one device based on their familiarity with the navigation process on the other device. Thus, there is therefore a need for techniques that provide users with a similar navigation experience on both mobile devices and computers (e.g., desktop computers).

SUMMARY OF THE INVENTION

Broadly speaking, the invention relates to techniques to facilitate participation of mobile devices in accessing resources over a data network. The data network can be wired, wireless or some combination thereof. In one aspect of the invention a mobile navigation metaphor is provided to yield similar navigation experiences on both mobile devices and personal computers. In another aspect of the invention, a central content server is able to return requested content to requesters in a format suitable for their device.

The invention can be implemented in numerous ways including, as a system, apparatus, method and computer readable medium. Several embodiments of the invention are discussed below.

As a method for providing a mobile navigation metaphor in a portal for a mobile device having a display screen, one embodiment of the invention includes the acts of: providing an image representation resembling the display screen of the mobile device but being displayed on a display screen of a personal computer, the image representation comprising contents that can be similarly displayed on the display screen of the mobile device; and generating an updated image representation whenever the contents are updated.

As a computer readable medium including at least computer program code for providing a mobile navigation metaphor in a portal for a mobile device having a display screen, one embodiment of the invention includes: computer program code for providing an image representation resembling the display screen of the mobile device but being displayed on a display screen of a personal computer, the image representation comprising contents that can be similarly displayed on the display screen of the mobile device; and computer program code for generating an updated image representation whenever the contents are updated.

The advantages of the invention are numerous. Different embodiments or implementations may have one or more of the following advantages. One advantage of the invention is that a similar navigation experience can be had for users of both mobile devices and personal computers. Another advantage of the invention is that servers can distinguish between requesting device types (e.g., mobile device vs. personal computer) so that the returned content is suitable for the requesting device type.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 4A shows a matching table used to synchronize user interfaces between two different browsers;

DETAILED DESCRIPTION OF THE INVENTION

In the following description of the present invention, numerous specific details are set forth in order to provide a thorough understanding of the present invention. However, it should be apparent to those skilled in the art that the present invention may be practiced without these specific details. The description and representation herein are the common means used by those experienced or skilled in the art to most effectively convey the substance of their work to others skilled in the art. In some instances, well known methods, procedures, components, and circuitry have not been described in detail to avoid unnecessarily obscuring aspects of the present invention.

The invention relates to techniques to facilitate participation of mobile devices in accessing resources over a data network. The data network can be wired, wireless or some combination thereof. In one aspect of the invention a mobile navigation metaphor is provided to yield similar navigation experiences on both mobile devices and personal computers. In another aspect of the invention, a central content server is able to return requested content to requesters in a format suitable for their device.

Figure 1A:
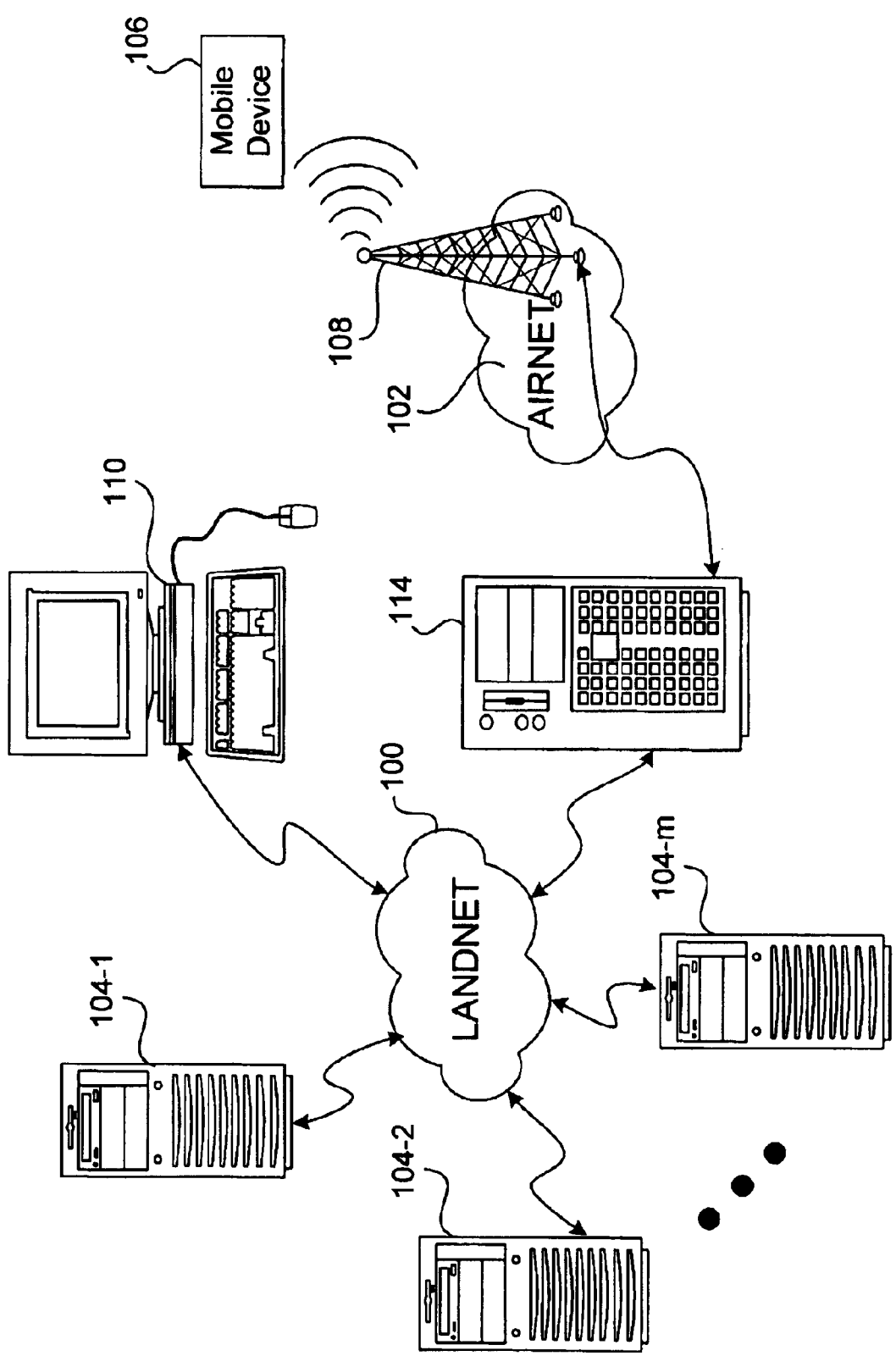
FIG. 1A shows exemplary system configuration in which the present invention may be practiced.

Referring to the drawings, in which like numerals refer to like parts throughout the several views, FIGS. 1A–6 are discussed in detail below. FIG. 1A illustrates an exemplary system configuration in which the present invention may be practiced. Landnet 100 is a landline network (wired network) that may be the Internet, the Intranet or a data network formed from a set of private networks. Airnet 102 is a wireless data network. Coupled to landnet 100 are a personal computer (PC) 110 representing one of the many computers coupled to landnet 100 and a plurality of network servers 104 (identified as elements 104-1, 104-2, . . . , 104-m in the figure). Preferably, personal computer 110 runs a HyperText Markup Language (HTML) browser, such as Netscape Navigator from Netscape Communications Corporation (www.netscape.com). The HTML browser accesses information stored in network servers 104 via landnet 100 using HyperText Transfer Protocol (HTTP). The network servers 104 may be workstations or desktop computers. The information stored in network servers 104 may be various media or hypermedia information and may include video footage, audio clips, text, hyperlinks, and various applications.

When network servers 104 provide information for mobile devices, the information may include mobile data designed for mobile devices. The mobile data may be expressed in a format that is more appropriate for transport over a wireless network and for presentation (i.e., display) on a screen of the mobile devices. In such cases, the mobile data may be communicated over the wireless network using a different protocol than that used for data transmitted over a wired network (e.g., the landnet). For example, the wired network might use HTTP and HTML protocols and the wireless network might use HTTP and HDML protocols.

Mobile device 106 represents one of many mobile devices serviced by airnet 102. Typically mobile device 106 is an interactive two-way communication device that includes, but is not limited to, a mobile computing device, a wireless telephone, a palm-sized computing device, a PDA, or an Internet-capable appliance remote controller. Mobile device 106 is capable of communicating wirelessly with antenna 108 via airnet 102.

For simplicity, antenna 108 also represents a wireless carrier infrastructure that generally comprises a base station and an operations and maintenance center. The base station controls radio or telecommunication links with mobile device 106. The operations and maintenance center comprises a mobile switching center performing the switching of calls between the mobile devices and other fixed or mobile network users. The operations and maintenance center manages mobile account services, such as authentication, and oversees the proper operation and setup of the wireless network. Each of the hardware components and processes in carrier infrastructure 108 are known to those skilled in the art and are not described herein to avoid unnecessarily obscuring aspects of the present invention.

Between landnet 100 and airnet 102 there is a server device 114 functioning as a bridge between the two networks 100 and 102. Server 114, also referred to as a link server, proxy server, wireless data server or network gateway server, may be a workstation or a personal computer. Link server 114 couples airnet 102 to landnet 100 to facilitate the communication between the two networks. It should be noted that server 114 may be of the same type as one of servers 104, except that it implements an embodiment of the present invention. In other words, any one of servers 104 may function as a proxy server.

Figure 1B:
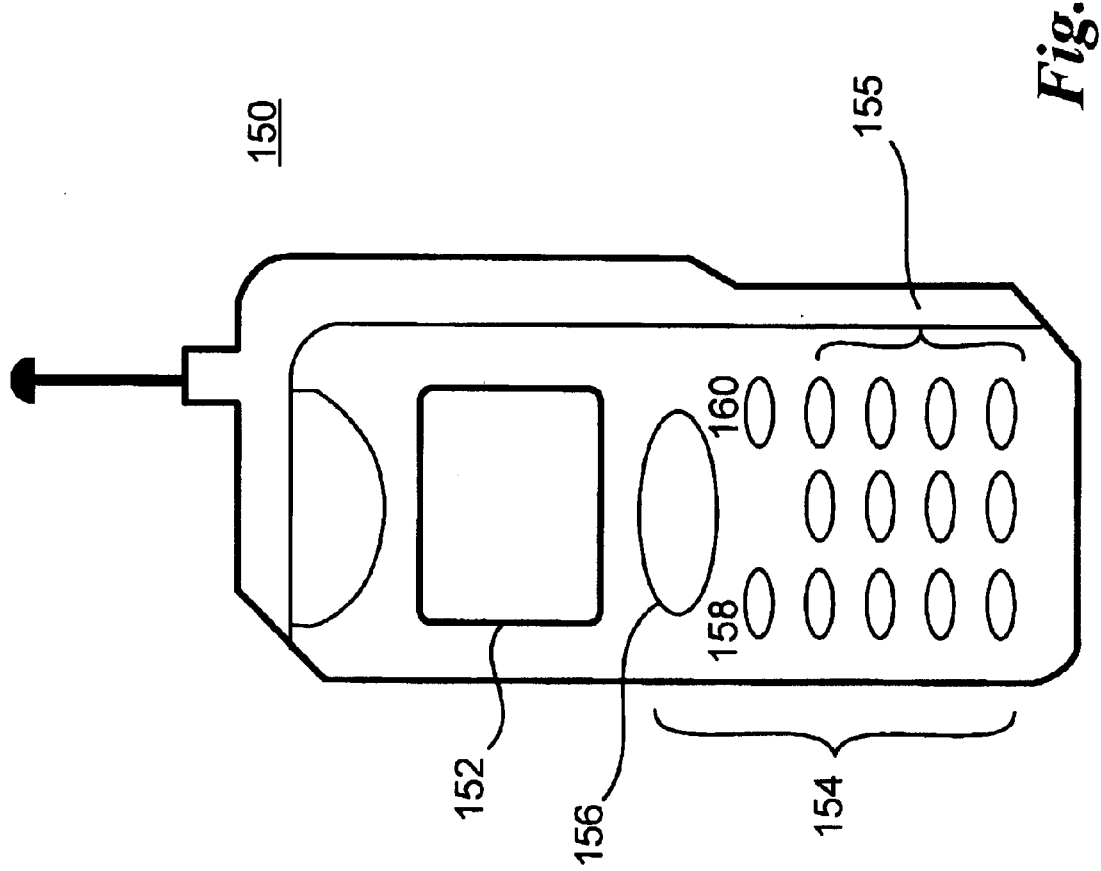
FIG. 1B depicts a mobile device (e.g., a digital cellular phone) that can be used in the exemplary system configuration of FIG. 1A.

To facilitate the description of the present invention, FIG. 1B depicts a cellular phone 150 that can be used as one of the mobile devices 106 in the exemplary system configuration of FIG. 1A. Cellular phone 150 includes a small screen 152 and an extended phone keypad 154. Screen 152 is typically a LCD display. Extended phone keypad 154 comprises, preferably, a regular phone keypad 155, a pair of generic keys 158 and 160 and positioning key 156. Generic keys 158 and 160 are used to activate soft keys displayed in screen 152, and positioning key 156 is used to reposition an element indicator or a cursor to activate a desired function (e.g., activate one of the hyperlinks displayed in screen 152). It should be understood that generic keys 158 and 160 and positioning key 156 are not necessary in practicing the present invention and can be replaced by a set of designated keys in regular phone keypad 155. Generic keys 158 and 160 provide a convenient means for a user to interact efficiently with the phone 150. Further, it should be understood that having a regular phone keypad is not a requirement to practice the present invention. Some of the mobile devices which may be used with the present invention may have few or no physical keys at all, such as those palm-size computing devices that use soft keys or icons as an input means for users to interact with the devices. In the following, unless otherwise specifically described, keys or buttons are generally referred to as either the physical keys or soft keys.

It is generally understood that a computer equipped with an HTML browser using HTTP can access hypermedia information in a server (e.g., server 104). However, HTTP requires considerable computing power and network bandwidth resources. For example, a request from the computer to establish a communication session with a network server may require an exchange of a number of data packets. In addition to the resources required to implement HTTP, significant resources must be supported in the computer to request, format, process and display information. This is not a significant disadvantage in many situations because the computer, including personal computers and workstations coupled to a network operating HTTP, generally has sufficient computing power, memory and display capabilities.

The computing resources available in cellular phone 150 of FIG. 1B or mobile devices 106 of FIG. 1A are typically much less than what is found in a personal computer. To enable such a mobile device to communicate efficiently with a data network, a micro-browser requiring less memory and configured to execute in a portable device may be used. An example of a micro-browser well-suited to operate in a mobile communication device is one designed and manufactured by Openwave Systems Inc., Redwood City, Calif., the assignee of the present invention. The micro-browser works efficiently when used to display a markup language file specifically designed for use with the portable device. Examples of such markup languages include HDML and WML.

Figure 2A:
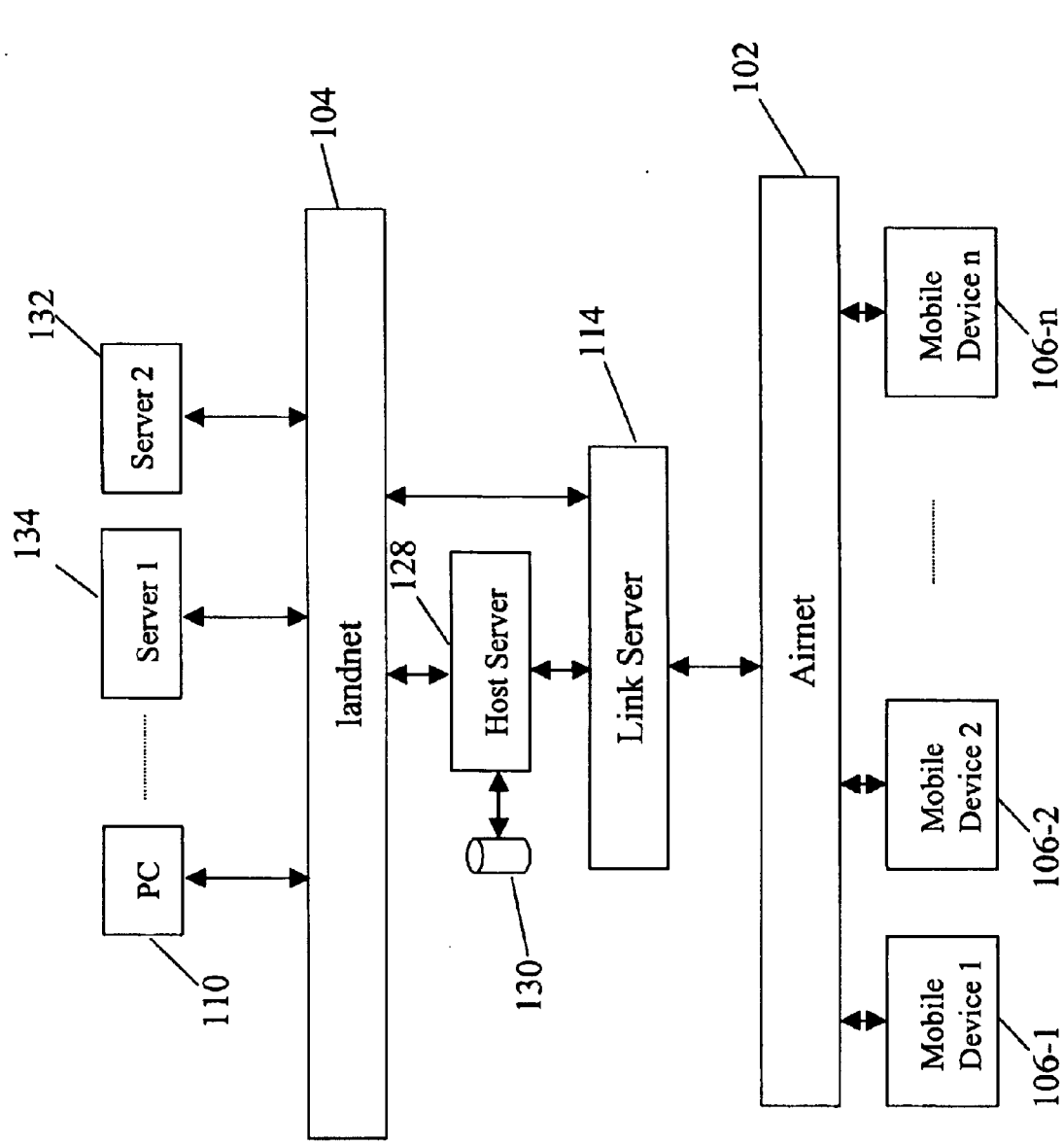
FIG. 2A shows an architecture based on the exemplary system configuration of FIG. 1A.

Referring now to FIG. 2A, there is depicted a system architecture based on the exemplary system configuration of FIG. 1A. As described above, the airnet 102 communicates simultaneously with a plurality of mobile devices 106 (shown as devices 106-1, 106-2, . . . 106-n in the figure). A PC 110 represents one of the computers that use the HTML browser running on HTTP to access other computers/servers 132 or 134 to fetch information on line or simply copy files therefrom. When employing the present invention, PC 110 can be used to pre-enter or organize the frequent transactions desired by a user of a mobile device through use of a larger user interface and easier user input.

It is generally understood that a database or an allocation of memory, as referenced by 130 in FIG. 2A, hosts a plurality of user accounts, each designated to an authorized capacity in which managed or personalized information is kept. The information stored in the user accounts can be used to provide a mobile navigation metaphor in a portal associated with mobile devices and PCs. Database 130 can be an independent storage location or physically a part of host server 128. To access the personalized information through a portal from a computer on landnet 104 or through a mobile device, the user needs first to be authenticated to enable access to a respective user account in the host server 128 or database 130. This is typically accomplished through use of a username/password pair or an assigned ticket (code).

Due to the reduced size, weight and cost of mobile devices as compared to desktop computers, most of the mobile devices also have very limited computing resources compared to such computers. Moreover, the graphics capabilities of the display screens of the mobile devices are also limited. Some of the mobile devices, such as a wireless telephone, have a keypad having far fewer keys or buttons than a PC keyboard has, which makes data entry laborious. For example, a user requesting information on Stanford University using Infoseek™ as the search engine, would have to input the following string:

www.infoseek.com followed by "Stanford University"

The string listed above includes over 40 characters. A user inputting a string of this type using a PC keyboard and browser (e.g., Netscape Navigator or Microsoft Explorer) would have no problem. However, the same user operating a keypad of a wireless device to input the string would be severely limited in terms of the speed of data entry due to the small number of available keys and the close spacing between them.

Some transactions frequently desired by a user of such mobile devices may be predetermined or pre-entered in a corresponding user account maintained in a host server 128 or link server 114, so that the user need only select desired transactions followed by a few letters. For example, if there is a list of stock symbols of interest in a user account that is associated with the user's mobile phone, a user of the mobile phone will not have to key in the symbols every time he desires to look up the current trading price of those stocks. Instead, the list of stock symbols can be previously entered and associated with the user account. When the phone user accesses an application program providing stock price information, the list of stock symbols and their corresponding prices can be automatically retrieved.

Figure 2B:
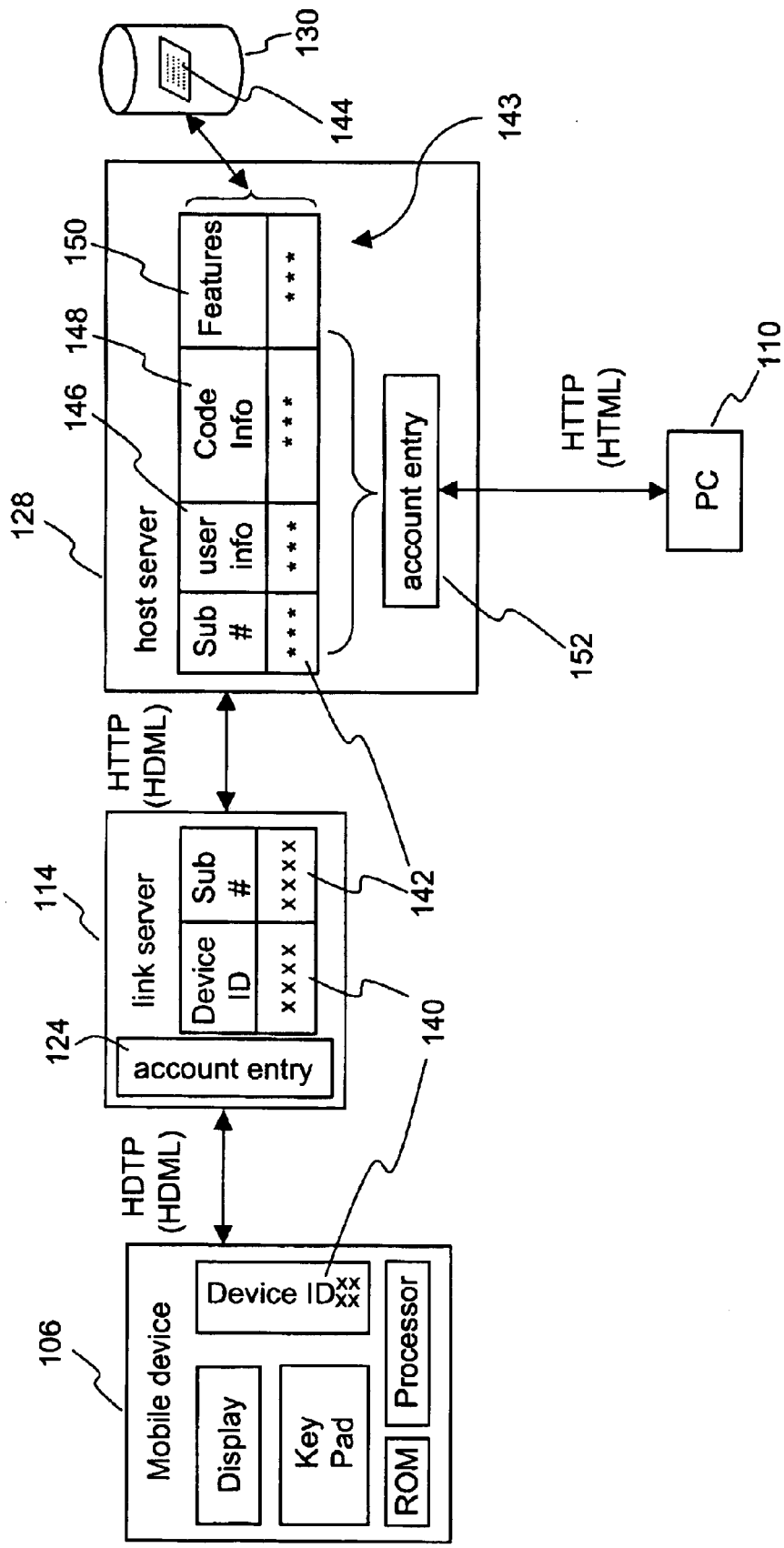
FIG. 2B shows a user account associated with a mobile device serviced by the exemplary system configuration of FIG. 1A.

FIG. 2B shows a user account associated with mobile device 106 according to one embodiment. Typically, each mobile device serviced by a carrier (responsible for host server 128) is assigned a device ID 140 which can be a phone number of the device, or a combination of an IP address and a port number, for example: 204.163.165.132:01905, where 204.163.165.132 is the IP address and 01905 is the port number. The device ID 140 is further associated with a subscriber number (sub #) 142 authorized by the carrier in link server 114 as part of the procedures to activate the phone 106. The sub # may take the form, for example, of 861234567-10900_pn.mobile.att.net by AT&T Wireless Service and is a unique identification to device 106. Each of the mobile devices 106 has a unique device ID that corresponds to a user account in a server (e.g., link server 114 or host server 128). It may be appreciated by those skilled in the art that the link server 114 does not have to be a separate server and can be a part of host server 128.

More generally, the user account associated with the mobile device 106 can be determined by user identity. The above-described use of subscriber numbers is one approach to determining the user identifications and thus the user accounts. Other approaches can, for example, use user name/password authentication, a portal-specific security model using cookies (e.g., HTTP cookies), or Secure Sockets Layer (SSL) client-side certificates.

According to one embodiment of the present invention, a corresponding account 144 in database 130 is indexed by an account structure 143 comprising the sub # 142, user information 146, code information 148, and feature information 150. The sub # 142 is received from link server 114 as an index to the account structure 143. User information 146 comprises the account configuration and other account related information. Code information 148 includes credential information to control entry to account 144 in the database 130. From the data network perspective, any computer can log on through HTTP to an account entry 152 identified by an address identifier (which may take the form of a universal resource identifier (URI) or universal resource locator (URL), for example, www.xyz.com).

As shown in the figure, the PC 110 may attempt to establish access to account entry 152. However, to access the account 144 in the database 130 associated with the PC 110 (namely, the user's account), the PC 110 can provide a code or password to the host server 128, which then can perform a verification of that code or password based on information contained in account structure 143. If the supplied confidential code or password matches that in account structure 143, then the access requested by the PC 110 is allowed, otherwise, the entry to the account 144 may be denied.

Upon completion of the authentication process, the user of PC 110 is typically presented with a portal page that comprises a plurality of hyperlinks to desired or frequently visited sites, along with other personalized information. The hyperlinks may be organized according to categories based on subject matter, type of service offered, or another criterion established by the user. The personalized information may take the form of contact or informative information or a user specified hierarchy of links to desired data.

Figure 3A:
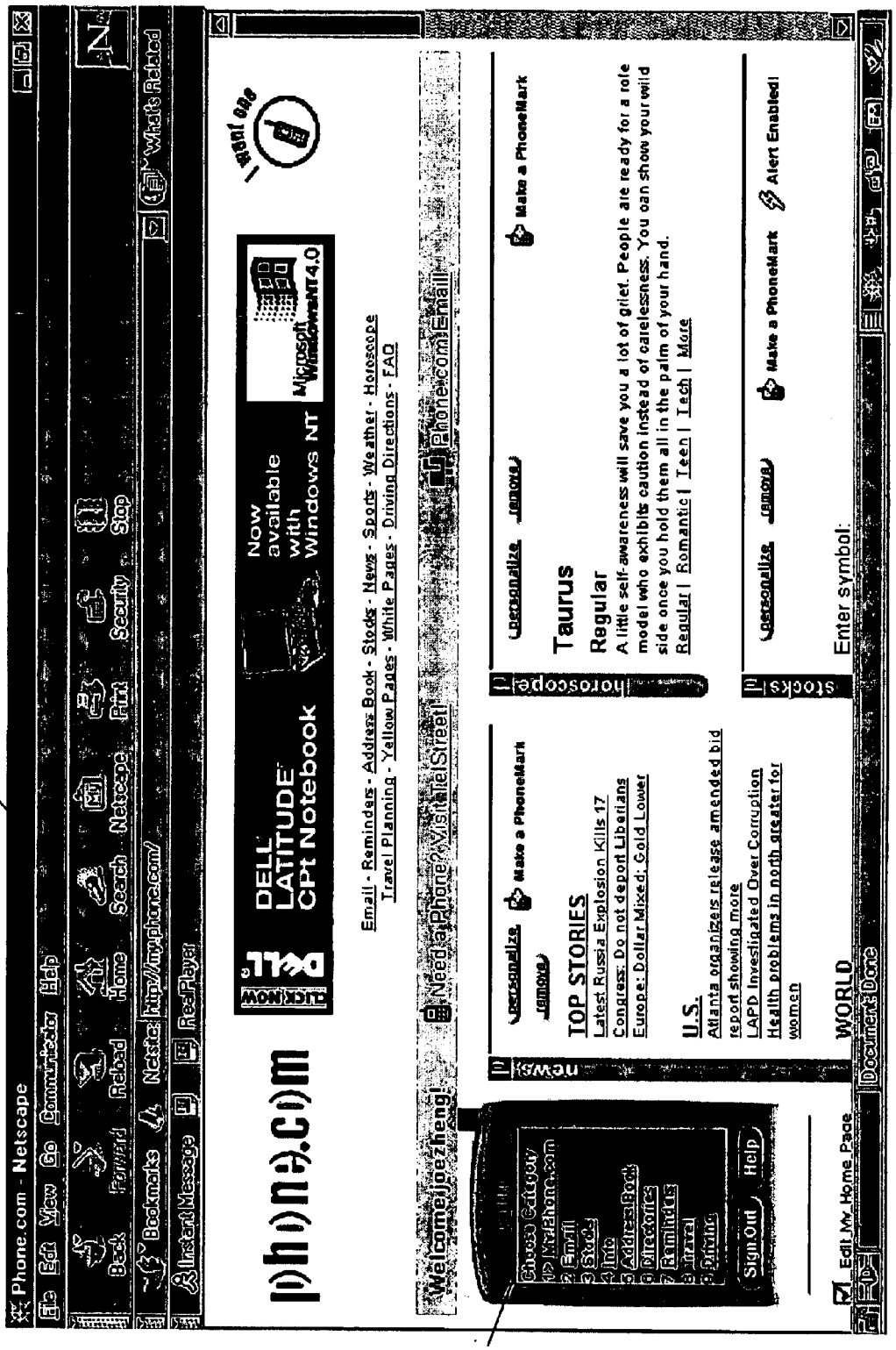
FIG. 3A shows an exemplary portal page according to one embodiment of the invention.

In accordance with one embodiment of the present invention, FIG. 3A shows a portal page 300 that comprises a mobile navigation metaphor 302. In this embodiment, the mobile navigation metaphor 302 is an image representation of a display screen of a mobile device. The portal page 300 also includes frequently visited hyperlinks, graphics, texts and other personalized information. The portal page 300 is displayed on the display screen of the PC.

It should be noted that although the mobile navigation metaphor 302 is shown in FIG. 3A as a replication of a mobile device navigation screen, it is not required to be an identical or near identical replication. Instead, the mobile navigation metaphor 302 should provide a sufficiently similar impression to a user of the mobile device. In other words, the image representation associated with the mobile navigation metaphor 302 reflects enough of the details of what is depicted on the display screen of the mobile device so that a user is provided with a similar navigation experience regardless of whether using the PC or the mobile device. Thus, depending on the actual implementation, the contents displayed in the mobile navigation metaphor 302 may or may not be identical but, in any case, substantially close to what is displayed on the display screen of the mobile device.

Hence, the mobile navigation metaphor for a wireless portal allows a user to obtain a similar navigation experience on a PC as on a mobile device. The similarity of the navigation experience will enable a user to better understand the menu structure of both the PC and mobile device interfaces, and to more efficiently navigate to a desired source of information by reinforcing the navigation experience using two different devices. In other words, a user will experience a navigation process on one device that reinforces that learned or experienced on the other device.

With respect to the mobile device interfaces, when mobile device 106 accesses the wireless portal, it will be prompted for authentication code information. In one implementation, device ID 140 and the sub # 142 may be used as the authentication code that will allow mobile device 106 to pass through account entry 124. In other implementations, authentication or user identification can be achieved using user name/password, cookies or certificates. Once the user of mobile device 106 is authenticated, the user is presented with a screen display that resembles the mobile navigation metaphor 302 illustrated in FIG. 3A. As used herein, a display screen is the physical display apparatus in a device, such as a Liquid Crystal Display (LCD) screen. A screen display is the image presented on the display screen.

Figure 3B:
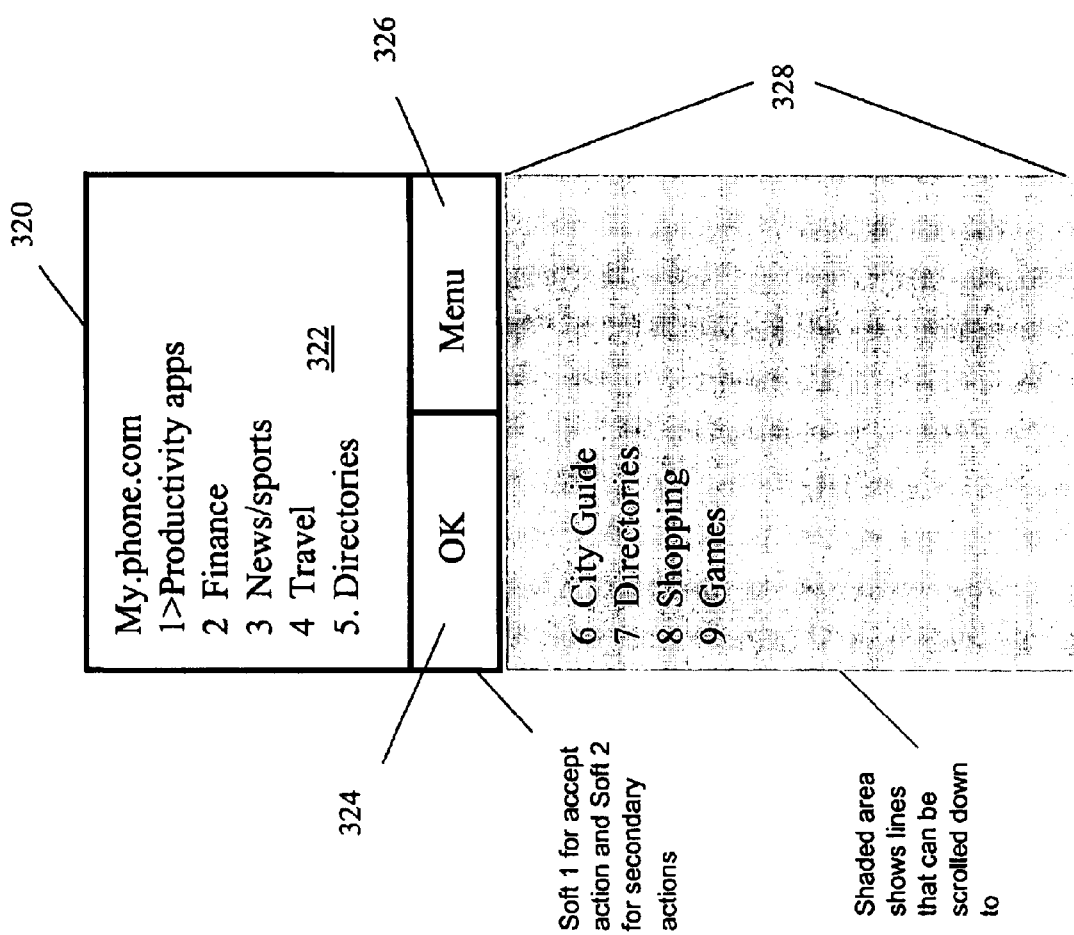
FIG. 3B illustrates a screen display for a mobile device according to the mobile navigation metaphor of FIG. 3A.

FIG. 3B illustrates a representative screen display 322 of the mobile device. Note that the screen display 322 was represented by the mobile navigation metaphor 302 of FIG. 3A. Display screen 320 is typically a LCD with limited display area. Note that the entire menu structure established by a user may exceed the display capabilities of the screen of the mobile device. In such cases, screen display 322 can be scrolled up or down by use of a scrolling key. Screen display 322 or display screen 320 also includes an "OK" button 324 and a "Menu" button 326.

Screen display 322 is a menu structure comprising a list of hyperlinks. In the example shown in FIG. 3B, the list includes nine (9) items, each item is a descriptive hyperlink representing a category of content. Due to the limited size of the display screen 320, only the first five (5) items of the list initially appear on the screen display 322. However, a remaining portion 328 of the list includes four (4) items which can subsequently appear on the screen display 322 following scrolling actions. If a user clicks or activates one of the hyperlinks, the user will be taken to the same or nearly the same content (e.g., page) or application he/she would be able to access using the same category in the mobile navigation metaphor present on the screen display of the desktop computer. The content or application may vary to make it appropriate for the device (e.g., mobile device or desktop computer). In one embodiment, a shared database service can be used to create a different user interface for the mobile or desktop device depending on the device type and characteristics of the software in the device responsible for producing the interface displays (e.g., the browser type in each device).

Typically, an application, service or set of data designed for presentation and use on a mobile device may not have the same structure or even features as a corresponding one designed for use by or presentation on a PC. This may be expressed by saying that each application, service, etc. has a "dual" nature. By this term is meant that each such application or service designed for use by a mobile device has a corresponding application or service designed for use on a PC, and that the two corresponding applications and services may not be identical in form or implementation. This is because there are situations in which certain features or functions of an application or service may be useful and supportable on one type of device, but not on the other. Furthermore, even if the same feature or function is implemented on both types of devices, the manner in which the feature or function is executed, or the manner in which the result of the feature or function is displayed, may differ between the two types of devices.

This situation of "dual" applications and services means that it is important that when a menu item is activated on the mobile device, the proper application or service for that class of device (e.g., mobile device) is accessed. Similarly, for the desktop computer or PC, it is important that when a menu item is activated the corresponding application or service for that class of device (e.g., PC) is accessed. Therefore, it is important that when a menu item on the inventive mobile navigation metaphor is accessed from the PC, the PC appropriate application or service is accessed.

According to one embodiment, the PC side executes an HTML browser while the mobile device executes a WML or HDML browser. The mobile navigation metaphor can also include personalized information including hyperlinks to frequently visited applications and displays. Also, whenever the menu structure of the mobile device is changed, the mobile navigation metaphor can be updated so that it is continues to be representative of the menu structure of the mobile device.

To ensure that both the PC and the mobile device access the appropriate application or service, a URL mapping function can be performed. Note that the mobile navigation metaphor can display a menu structure having links to the mobile device appropriate applications or services or to the PC appropriate applications or services. In the case that the metaphor hyperlinks are for the mobile device side applications or displays, when one of the hyperlinks in the mobile navigation metaphor is activated, a request including a URL is generated to cause the host server to look up a URL corresponding to the same hyperlink for the PC. This is accomplished by the URL mapping function.

Referring to FIG. 4A, there is shown a URL matching table 400 suitable for synchronizing user interfaces between the two browsers or devices by implementing a mapping function. A portal is hosted in a server identified by an address such as my.phone.com. According to one embodiment, the mobile navigation metaphor on the portal page accessible by a PC includes a list of applications 402, with each identified by an address identifier that serves as a hyperlink. In the URL matching table 400, each of the address identifiers for the HTML browser 404 corresponds to an address identifier for HDML or WML browser 406. Thus, if the hyperlinks in the mobile navigation metaphor for the applications 402 correspond to those appropriate for the mobile device then, when such a hyperlink is activated at the PC device, the corresponding hyperlink for the PC device browser (e.g., HTML browser 404) would instead be selected from the table and activated. Similarly, if the hyperlink is a more general reference to a particular application 402, then the appropriate HTML browser link or WML browser link would be selected from the table depending on the type of browser in use. The URL matching table 400 includes examples for three different applications 402. For a home page application, the mapped URL can be the same. The mapped URL directs the user to the home page of a wireless portal regardless of browser type. For a mail application, the mapped URL can be directed to different servers (i.e., mail servers) that provide the same content (e.g., same email contents). In this case, the applications being mapped to are for mail services but different servers are used because of the different implementations used by the different devices. For a stock application, the mapped URL can be directed to a common server but an indication (e.g., "HTML" or "WML") can be provided to inform the server of the browser type so that the content returned to requesting devices is suitable for display on the requesting devices.

Figure 4B:
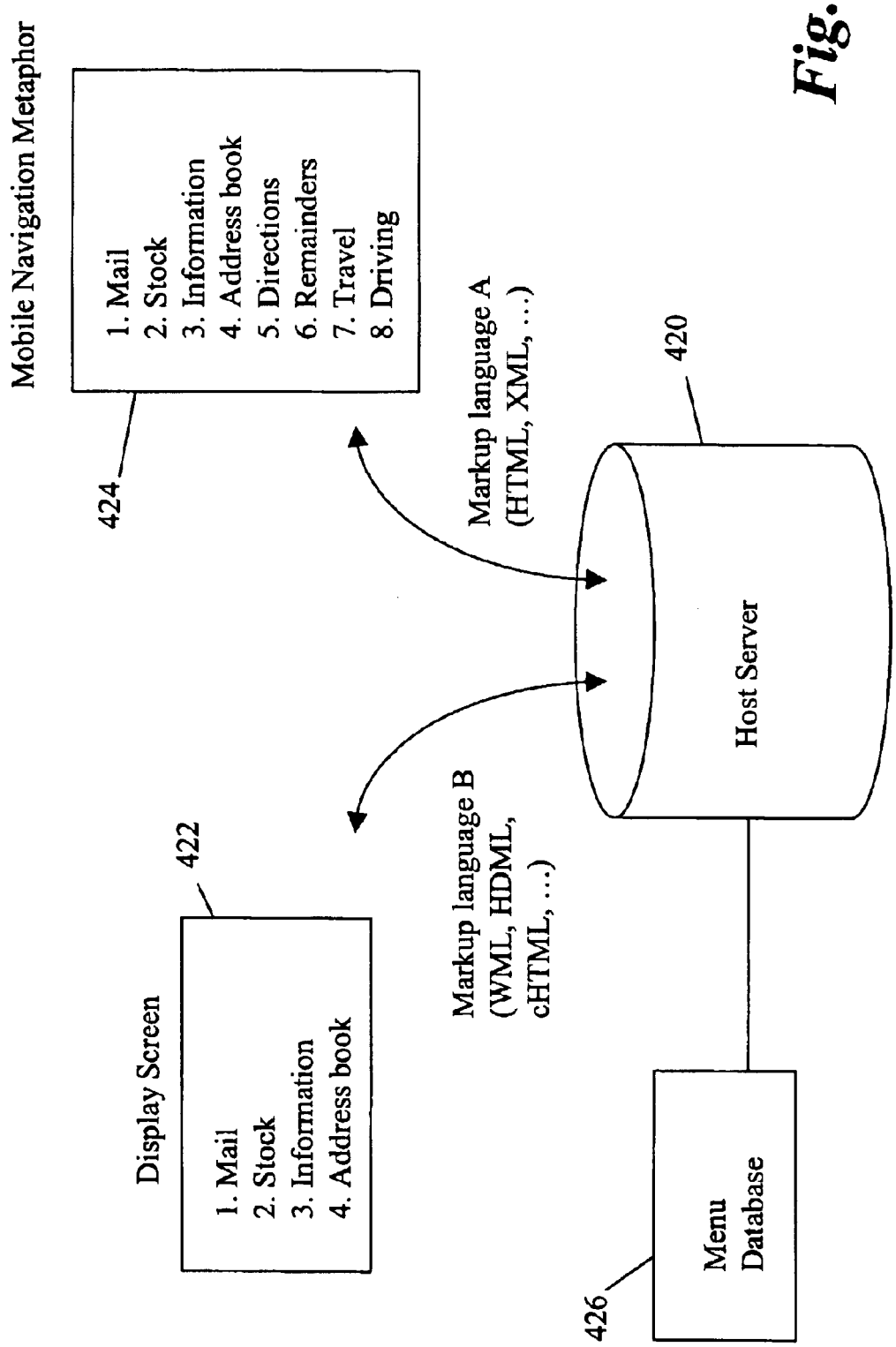
FIG. 4B shows a menu generation system in which a single database service is used in creating different user interfaces depending on the browser type.

FIG. 4B shows a host server 420 for use in creating different user interfaces depending on the type of browser and/or device according to one embodiment of the invention. The host server 420 can be used to cause changes made to a mobile device screen display 422 which displays a menu structure on the PC in the form of a mobile navigation metaphor 424. The host server 420 may also be used to cause changes made to the PC menu structure to be displayed on the mobile device screen display 422 and on the mobile navigation metaphor 424 (this function may occur automatically or by execution of a "metaphor update" function).

For example, a user may edit a list of choices on the mobile device using a WML browser. Upon an activation of a "SEND" key, the edited list is sent to the host server 420 that operates a menu generation process in conjunction with device information stored in a menu database 426. The menu generation process produces an appropriate menu for the requesting device based on the device information. The device information can, for example, include one or more of: device characteristics, rendering context for the menu, user identity and/or browser type utilized by the requesting device.

The generation of the menu (list) for the mobile navigation metaphor allows the user to access the PC side applications from a menu structure defined on a mobile device. For example, a user updates a menu on the mobile device and the updated menu in WML is sent to the host server 420. Here the updated menu is converted to a new menu in HTML that can be displayed in the mobile navigation metaphor on the PC device. The HTML compatible links accessible by the HTML menu of the mobile navigation metaphor permit a mobile device user to navigate to the PC side appropriate applications or services via the mobile navigation metaphor on the PC device using the menu structure of the mobile device. Conversely, when a user updates a menu in the mobile navigation metaphor, the host server 420 updates the menu for the mobile device. Furthermore, when a user alters the menu structure (e.g., by adding or deleting bookmarks, etc.) on the PC side, the mobile navigation metaphor is also updated to reflect those changes.

Figure 4C:
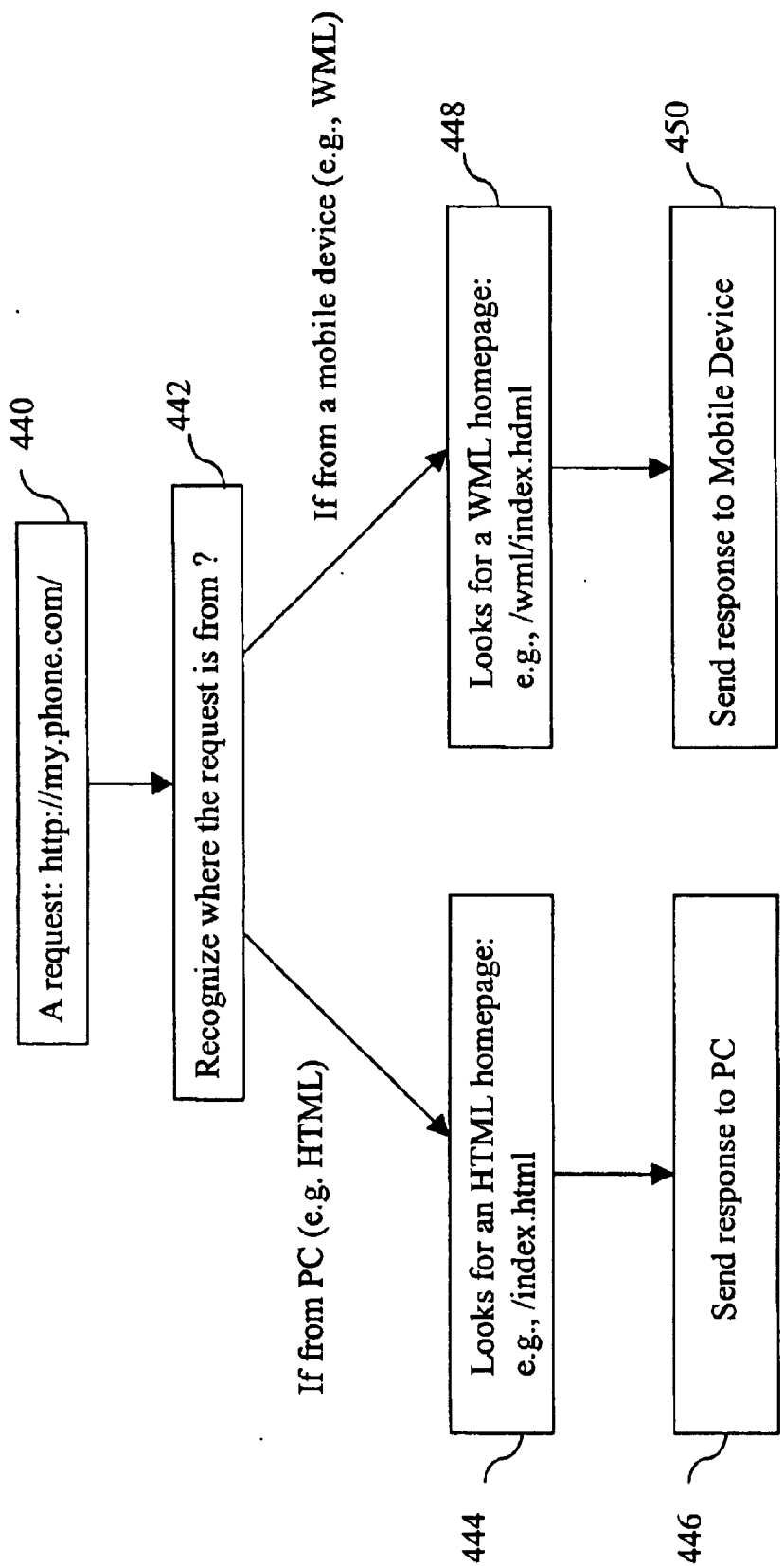
FIG. 4C shows a flow diagram in which a request is received and parsed to access appropriate data, applications, and services in a host server.

Regarding the URL mapping, there are several situations in which the corresponding URLs may be looked up in a different manner. As far as a mobile portal is concerned, both a PC and a mobile device can access the same menu database 426. FIG. 4C shows that a request is received 440 in the host server 420. The request can be sent to the host server 420 from either the PC side or the mobile device. Since the request can comprise indication information about the browser being executed, the host server 420 can recognize 442 which type of device is making the request. Based on the type of device, the host server 420 determines where to find an appropriate page to be returned to the requesting device. This may be referred to as a dynamic mapping of the URLs. More particularly, when the request is from a PC device, the host server 420 locates 444 the HTML page and then sends 446 a response (including the HTML page) to the PC device. Alternatively, when the request is from a mobile device, the host server 420 locates 448 the WML page and then sends 450 a response (including the WML page) to the mobile device.

In another situation, the menu generation server host server keeps two separate files having the same contents, each for one type of browser. The exact access to the right file is dependent on a flag in the request as an example shown in FIG. 4A. A request from the mobile device, if executing a WML browser, comprises a flag "wml" so that the menu generation server can be advised of which file shall be fetched.

In still another situation, the URL mapping occurs in a one-to-one fashion. According to one embodiment shown in FIG. 4A, an application (e.g., email application) is kept at two different locations, one for the PC and one for the mobile device. With the mapping, an email sent from either the PC or the mobile device will be recognized as from the same account or source.

Figure 4D:
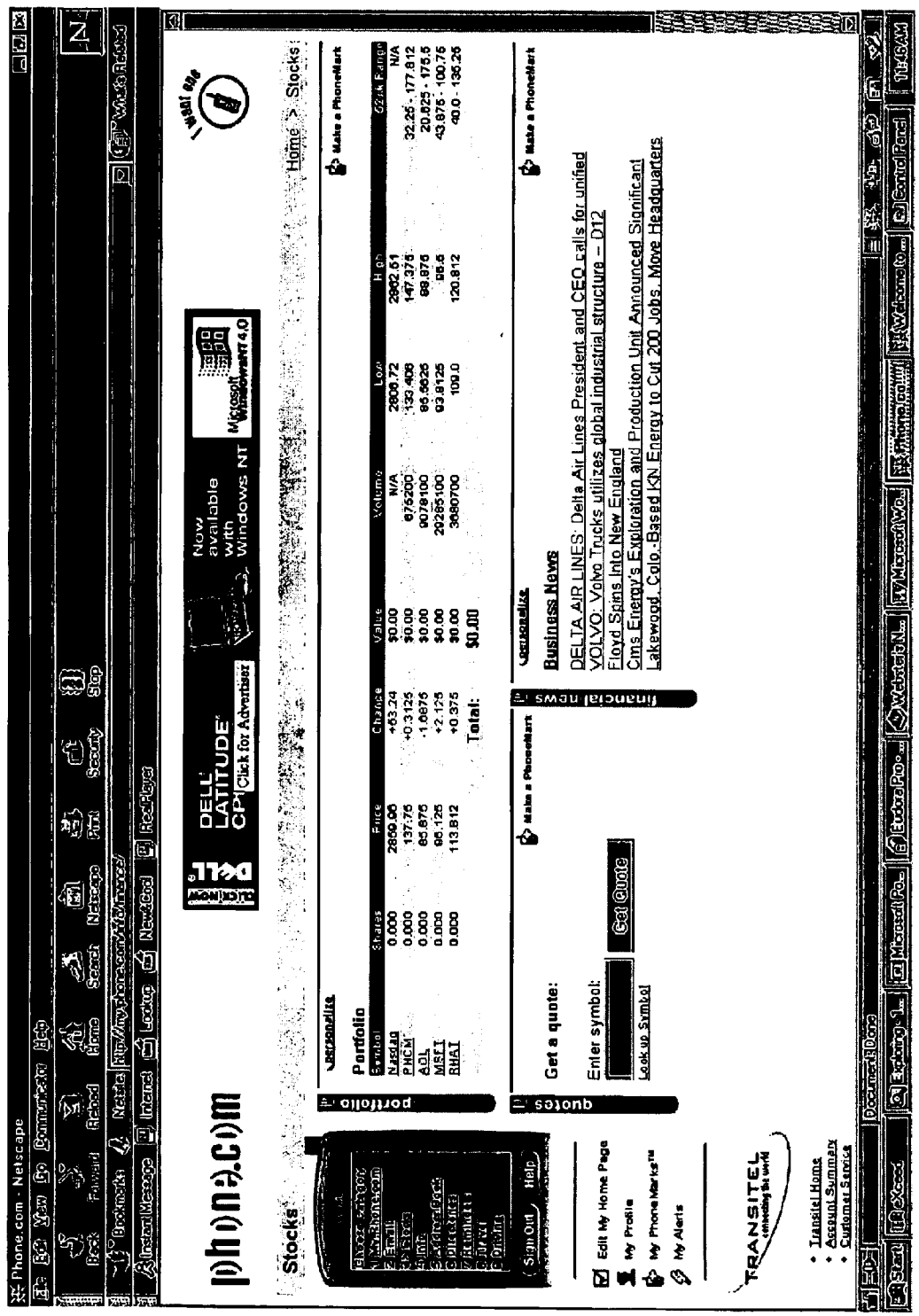
FIG. 4D shows a second exemplary portal page according to one embodiment of the invention after the "stock" link in the mobile navigation metaphor with respect to the first exemplary portal page is activated.

FIG. 4D shows a second portal page 452 after a "stock" link 454 in the mobile navigation metaphor 456 is activated (i.e., selected). Namely, the second portal page 452 follows from the first portal page 300 of FIG. 3A after the "stock" link in the mobile navigation metaphor 302 is activated. The second portal page 452 shows that a list of stock symbols is in a personalized portfolio area 458 and pertinent information (e.g., shares, price, change, value, low, high, 52 wk range) for the symbols is also displayed. The file associated with the second portal page 452 is an HTML file which describes the second portal page 452 to be displayed on the display screen for the PC device. However, given the normally smaller display screen of mobile devices, all the information of the second portal page 452 normally is not able to be concurrently displayed on the display screen of the mobile device. When the user activates a link on the mobile device, the corresponding request will cause the host server to provide the same content but typically less content (due to its smaller display screen) and in a slightly different format for the PC device.

Figure 4E:
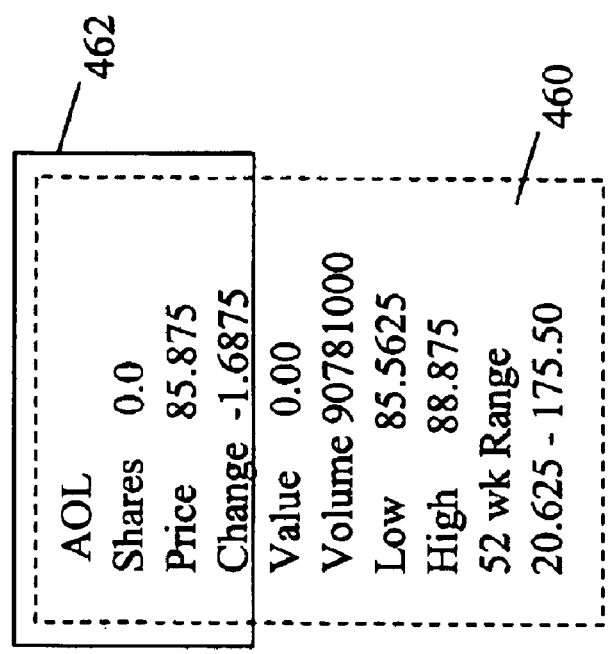
FIG. 4E illustrates a screen display for a mobile device according to the mobile navigation metaphor of FIG. 4D.

FIG. 4E shows corresponding display content 460 displayed on display screen 462 of a mobile device. The corresponding display content 460 represents information about one of the stocks (namely, AOL) within the personalized portfolio 458 of the second portal page 452. The display content 460 is, for example, produced by a WML file that may be either dynamically generated from the content or a counterpart WML version of the HTML file. Since the corresponding display content 460 exceeds the display screen 462, only a portion of the corresponding display content 460 is initially displayed on the display screen 462.

As described above, one of the important features in the present invention is to allow efficient access to the same personalized information hosted in a database from two different devices running two different browsers and communicating over two different networks. Further, with the provided mobile navigation metaphor, the navigation experience through the personalized information from the two different devices becomes similar enough to reinforce the particular navigation experience.

Figure 5A:
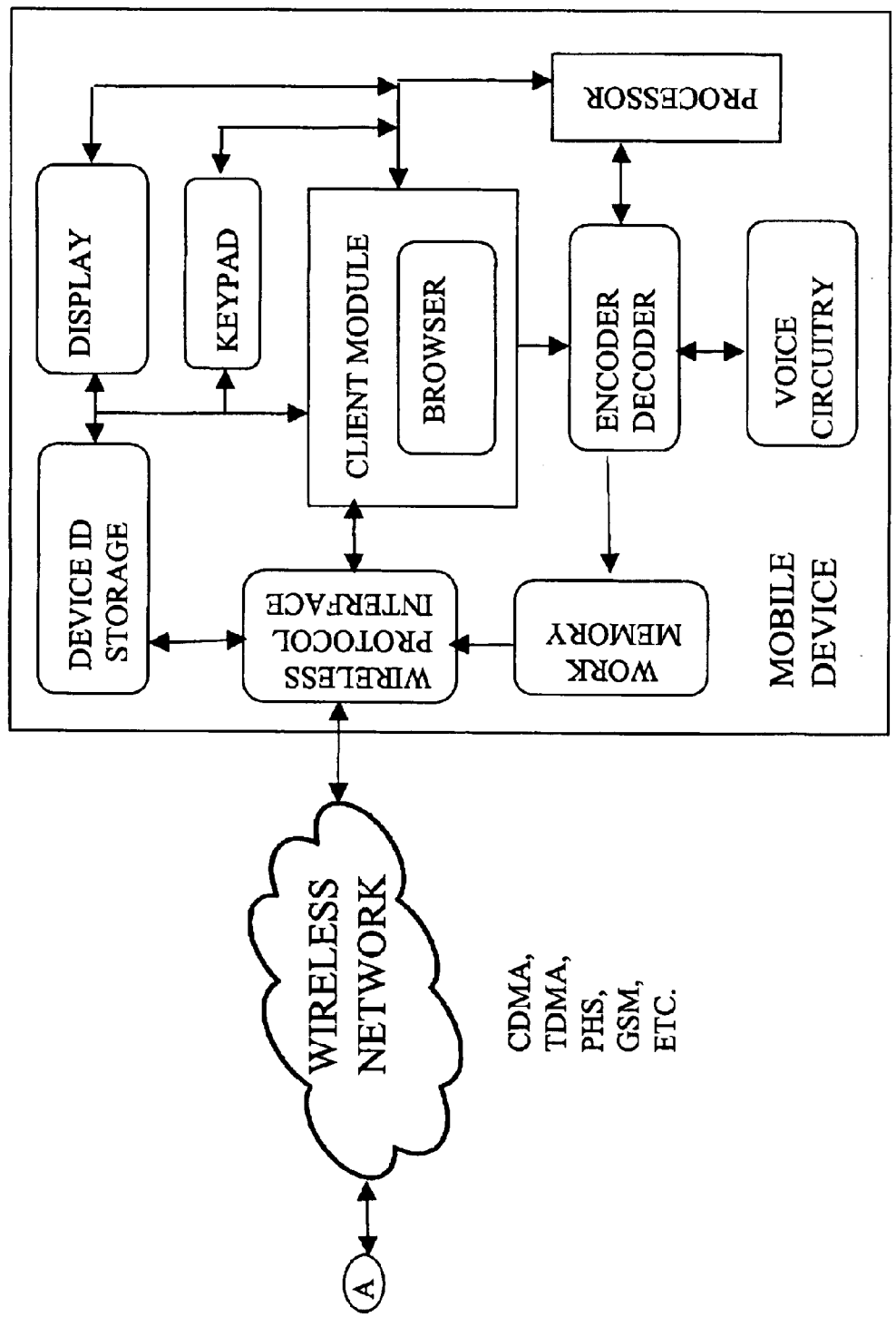
FIG. 5A illustrates a block diagram of a mobile device according to one embodiment of the present invention.
Figure 5B:
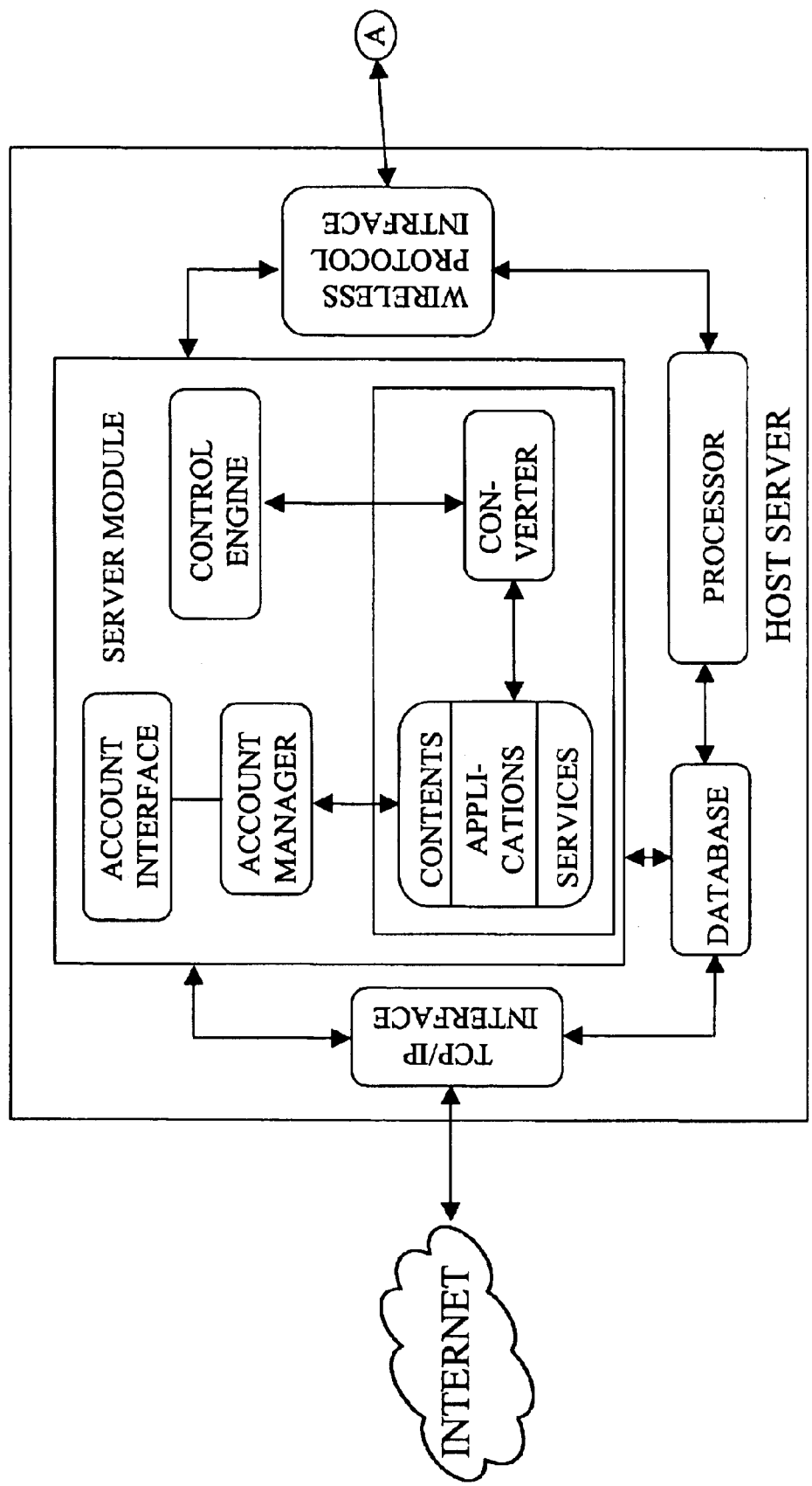
FIG. 5B illustrates a block diagram of a host server according to one embodiment of the pint invention.

FIGS. 5A and 5B show, respectively, a diagram of a mobile device and a host server according to one embodiment of the present invention. A client module in the mobile device includes a micro-browser that works efficiently with applications, files and data designed for the mobile device. A server module is a complied and link version of an embodiment of the present invention and comprises an account manager managing, though an account interface, accounts of users that maintain a portal in the server. The server module further comprises a control engine that interacts with a database and performs URL mapping to ensure dual applications, services and data are available.

Figure 6:
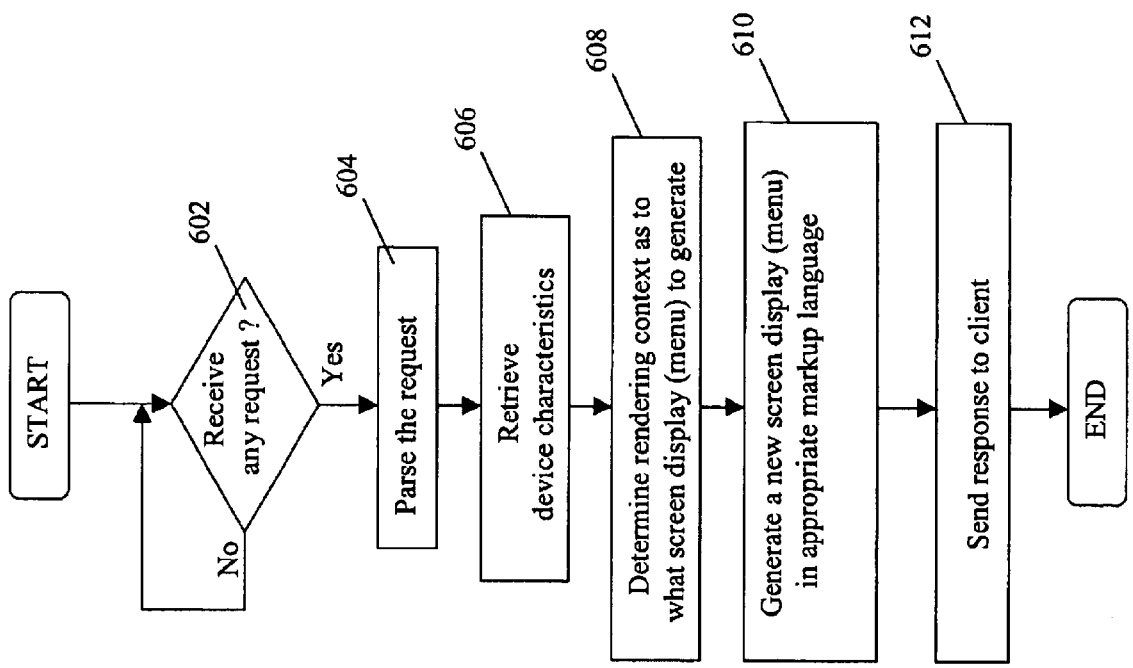
FIG. 6 shows a process flowchart for the host server of FIG. 5B according to one embodiment of the present invention.

FIG. 6 shows a process flowchart for a host server according to one embodiment of the present invention. At 602, the host server that hosts a portal awaits a request from a mobile device. When the request is received and authenticated, the request is parsed to determine the user identity at 604. Based on the user identity, the process retrieves device characteristics (e.g., browser type, screen type or size) and other information pertinent to the creation of a response at 606. A rendering context must be determined at 608 in order to decide what display (menu) to generate and what markup language to use. In particular, the choice of menu (e.g., root menu) is determined. This is typically determined from data passed in the request (for example, an integer context identifier may be provided in the request). Based on the user identity, rendering context, markup language choice, and menu records, a menu is generated at 610. One of the key features here is the selection of the right URL (e.g., embed HDML URLs in HDML markup) and the layout/navigation appropriate for a given device. At 612, a corresponding response is sent.

Although the process flowchart of FIG. 6 pertains to a response to a request from a mobile device, similar processing can be used to process a request from a personal computer. More particularly, when the personal computer displays the mobile device metaphor, when a request for content is made by a selection with respect to the mobile device metaphor (e.g., a link within the mobile device metaphor), the response returned to the personal computer can be the requested content in a format suitable for the personal computer. The response returned can optionally also include the mobile device metaphor which has been updated in accordance with the selection.

While the forgoing and attached are illustrative of various aspects/embodiments of the present invention, the disclosure of specific sequence/steps and the inclusion of specifics with regard to broader methods and systems are not intended to limit the scope of the invention which finds itself in the various permutations of the features disclosed and described herein as conveyed to one of skill in the art.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over network coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for providing a mobile navigation metaphor in a portal for a mobile device having a display screen, said method comprising:

providing an image representation resembling the display screen of the mobile device but being displayed on a display screen of a personal computer, the image representation comprising contents that can be similarly displayed on the display screen of the mobile device; and generating an updated image representation whenever the contents are updated.

2. A method as recited in claim 1, wherein the contents can be updated through the mobile device or the personal computer.

3. A method as recited in claim 1, wherein the contents includes a menu or a list of URLs.

4. A method as recited in claim 1, wherein the mobile device is a mobile telephone.

5. A method as recited in claim 1, wherein a selection of an item of the contents of the image representation being displayed on the display screen of the personal computer invokes a same or similar action than would be invoked if the same item were selected from the display screen of the mobile device.

6. A method as recited in claim 5, wherein the contents includes a menu or a list of URLs.

7. A method as recited in claim 6, wherein the contents can be updated through the mobile device or the personal computer.

8. A computer readable medium including at least computer program code for providing a mobile navigation metaphor in a portal for a mobile device having a display screen, said computer readable medium comprising:

computer program code for providing an image representation resembling the display screen of the mobile device but being displayed on a display screen of a personal computer, the image representation comprising contents that can be similarly displayed on the display screen of the mobile device; and computer program code for generating an updated image representation whenever the contents are updated.

9. A computer readable medium as recited in claim 8, wherein the contents can be updated through the mobile device or the personal computer.

10. A computer readable medium as recited in claim 8, wherein the contents includes a menu or a list of URLs.

11. A computer readable medium as recited in claim 8, wherein the mobile device is a mobile telephone.

12. A computer readable medium as recited in claim 8, wherein a selection of an item of the contents of the image representation being displayed on the display screen of the personal computer invokes a same or similar action than would be invoked if the same item were selected from the display screen of the mobile device.

13. A computer readable medium as recited in claim 12, wherein the contents includes a menu or a list of URLs.

14. A computer readable medium as recited in claim 13, wherein the contents can be updated through the mobile device or the personal computer.

15. A computer readable medium as recited in claim 13, wherein the mobile device is a mobile telephone.

* * * * *

UNITED STATES PATENT AND TRADEMARK OFFICE
CERTIFICATE OF CORRECTION

PATENT NO. : 6,715,131 B2
DATED : March 30, 2004
INVENTOR(S) : Martin, Jr. et al.

It is certified that error appears in the above-identified patent and that said Letters Patent is hereby corrected as shown below:

Column 3,
Line 26, "shows exemplary" should be -- shows an exemplary --
Line 59, "pint" should be -- present --

Signed and Sealed this

Twenty-seventh Day of July, 2004

JON W. DUDAS
*Acting Director of the United States Patent and Trademark Office*